S. HARTSHORN.

Shade Fixtures.

Reissued September 2, 1873.

No. 5,558.

Attest:
Thos Inshe
J. A. Fraser

Inventor;
S. Hartshorn
Per Munn & Co
Attorneys.

AM. PHOTO-LITHOGRAPHIC Co. N.Y. (OSBORNE'S PROCESS)

UNITED STATES PATENT OFFICE.

STEWART HARTSHORN, OF NEW YORK, N. Y.

IMPROVEMENT IN SHADE-FIXTURES.

Specification forming part of Letters Patent No. 68,502, dated September 3, 1867; reissue No. 5,558, dated September 2, 1873; application filed March 29, 1873.

*To all whom it may concern:*

Be it known that I, STEWART HARTSHORN, of the city, county, and State of New York, have invented a new and Improved Shade-Fixture; and I do hereby declare that the following is a full, clear, and exact description thereof, which will enable others skilled in the art to make and use the same, reference being had to the accompanying drawings forming part of this specification.

This invention relates to a new and useful improvement in that class of shade-fixtures in which the shade-roller is provided with a spiral spring for automatically winding up the shade. The present invention is an improvement on a shade-fixture of this class, for which Letters Patent were granted to me, bearing date October 11, 1864, and reissued August 27, 1867, in which the pawl and ratchet or notched hub, designed and used to arrest the rotation of and hold the roller, were arranged to act automatically and in such a manner that the shade could be stopped and retained at any desired position or point within the scope of its movement, by simply manipulating the shade and varying the speed of the rotation of the roller, and thereby dispensing with the use of side cords or counterpoises. As described and illustrated in such patent, the notched hub was attached to or made a part of the roller, while the pawl was fixed to one of the brackets which supported the roller. In such arrangement of the parts, when the shade-roller is removed from its brackets or bearings, and the pawl and notched hub are consequently disconnected, the spring in the roller unwinds, which involves the necessity of again winding up the spring previous to replacing the roller in its bearings, which could not be done by an unskilled person without considerable difficulty. My present invention is designed to obviate such objection, and consists in attaching to the shade-roller both the pawl or detent and ratchet or notched hub, when such pawl or detent and ratchet or notched hub are so constructed and combined that the pawl will act automatically by simply manipulating the shade and varying the speed of the rotation of the roller, so that the tension of the spring will be preserved, or the spring will be prevented from unwinding, as well when the roller is removed from its brackets as when it is resting therein.

Figure 1:
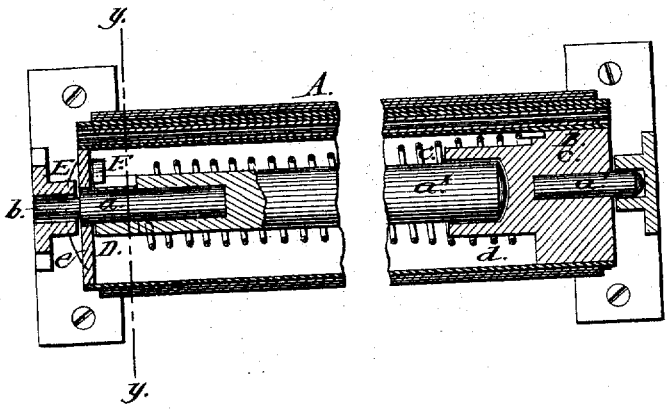
Figure 2:
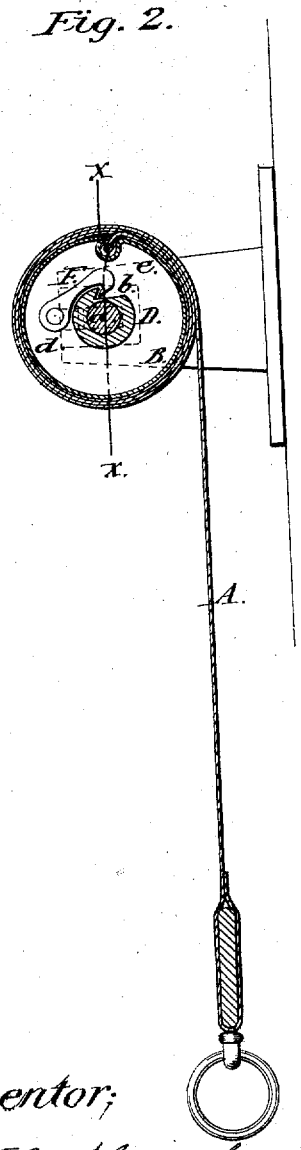

In the accompanying sheet of drawings, Figure 1 is a longitudinal central section of my invention taken in the line *x x*, Fig. 2. Fig. 2 a transverse section of the same taken in the line *y y*, Fig. 1.

Similar letters of reference indicate corresponding parts.

A represents a window-shade, and B the roller to which it is attached, the roller having a spiral or other spring, C, fitted within it and arranged in such a manner that it will have, when not restrained, a tendency to roll up the shade. The spring attachment, as represented, is the same as shown and described in my original letters patent. The roller B is provided with journals *a a'*, to one of which, *a*, a hub, D, is keyed, said hub having a notch, *b*, made in it, as shown clearly in Fig. 2. The journal *a* of the roller has a square or two flat sides at its outer end, as shown at *b*, to fit into a bracket, E, attached to the window-frame, and this journal *a* does not turn with the roller, but the other journal *a'* is fitted firmly in a head, *c*, in the roller and turns with it; and to such head the case of the roller (a metallic tube, *d*,) is attached, the journal *a*, or an extension, $a^{\times}$, thereof, being fitted loosely in the head *c*, so that the roller may turn without the journal *a*, as will be fully understood by referring to Fig. 1. The end of the case or tube *d* of the roller has a disk, *e*, secured in it, and this disk, as the roller B rotates, turns loosely on the fixed journal *a*. This disk *e* has a pawl or detent, F, attached to its inner side, shown more particularly in Fig. 2, and this pawl or detent, when engaged with the notch *b* in hub D, retains or holds the roller B, so that it cannot turn under the influence of the spring C and roll up the shade A. The spring, when fitted in the case *d*, is attached on one end to the head *c*, and the other end to the fixed journal *a* or to its extension, $a^{\times}$, and the spring is wound up by pulling down the shade B; consequently when the shade is fully down the spring will have a tendency to wind it up. The pawl or detent F engages itself with and disengages itself from the notched hub D automatically. In the construction shown in the drawing, in order to insure the pawl engaging itself with the hub, the motion of the shade is simply checked; for, by having the disk *e* rotate slowly, the pawl will drop into the notch *b* of the hub; but when said disk is allowed to rotate rather quickly the pawl or detent will pass over the notch *b*, not having time to drop into it. Hence the shade may be retained at any desired height without any difficulty whatever, as in the roller described in the previous patent, by merely varying or changing, through the simple manipulation of the shade, the speed of the rotation of the roller, and the consequent movement of the shade. The difference, however, between the within-described arrangement and that shown in the former invention, in respect to the preserving or retaining the tension of the spring in the roller when removed from its brackets, is essential. In the original plan the spring C unwinds immediately as soon as the roller is removed from its bracket or bearings, as the pawl or detent instead of being attached to the roller, or any part connected therewith, is attached to the bracket, the notched hub being attached to the journal of the roller; and when the notched hub is removed from the pawl the spring immediately unwinds. In my present improvement the pawl or detent and notched hub being both connected with the roller, the spring is retained or prevented from unwinding equally as well when the roller is removed from its brackets or bearings as when adjusted in them.

Having thus described my invention, what I claim as new, and desire to secure by Letters Patent, is—

In a shade-roller, provided with a spring for rolling up the curtain, and having a pawl or detent and ratchet or notched hub, constructed and operating substantially as described, for holding the shade in any position or at any height, the arrangement of such pawl or detent and ratchet or notched hub upon and to the roller, instead of attaching one of such parts to the bracket, or to a part separate from the roller, substantially as and for the purposes set forth.

STEWART HARTSHORN.

Witnesses:
S. D. LAW,
A. T. GURLITZ.